United States Patent [19]

Pryor

[11] 4,252,254
[45] Feb. 24, 1981

[54] HOT BEVERAGE VENDOR

[75] Inventor: Harry H. Pryor, Crestwood, Mo.

[73] Assignee: UMC Industries, Inc., Stamford, Conn.

[21] Appl. No.: 60,780

[22] Filed: Jul. 26, 1979

[51] Int. Cl.³ .............................................. B67D 5/62
[52] U.S. Cl. .................................... 222/67; 222/129.1
[58] Field of Search .................... 222/67, 68, 146 HE, 222/129.1, 162, 54, 64

[56] References Cited

U.S. PATENT DOCUMENTS

| | | | |
|---|---|---|---|
| 1,047,389 | 12/1912 | Cooper | 222/67 UX |
| 3,565,045 | 2/1971 | Knox, Jr. | 122/13 |
| 3,915,341 | 10/1975 | Brown | 222/67 |
| 3,921,855 | 11/1975 | Syverson | 222/67 |

*Primary Examiner*—Stanley H. Tollberg
*Attorney, Agent, or Firm*—Senniger, Powers, Leavitt and Roedel

[57] ABSTRACT

A hot beverage vendor having a hot water tank for supplying hot water for hot beverages, such as coffee, tea, soup and chocolate. On entering the tank, water is directed by baffles to a heater in the tank adjacent the bottom of the tank where it is heated. The heated water gradually rises in the tank for flow into the open top of a relatively small collecting tank mounted inside the hot water tank above the heater. The vendor further includes apparatus operable on a vend cycle for dispensing hot water from the collecting tank for the vending of a drink, with the dispensed water being relatively rapidly replaced by heated water flowing into the collecting tank from the main part of the hot water tank.

17 Claims, 5 Drawing Figures

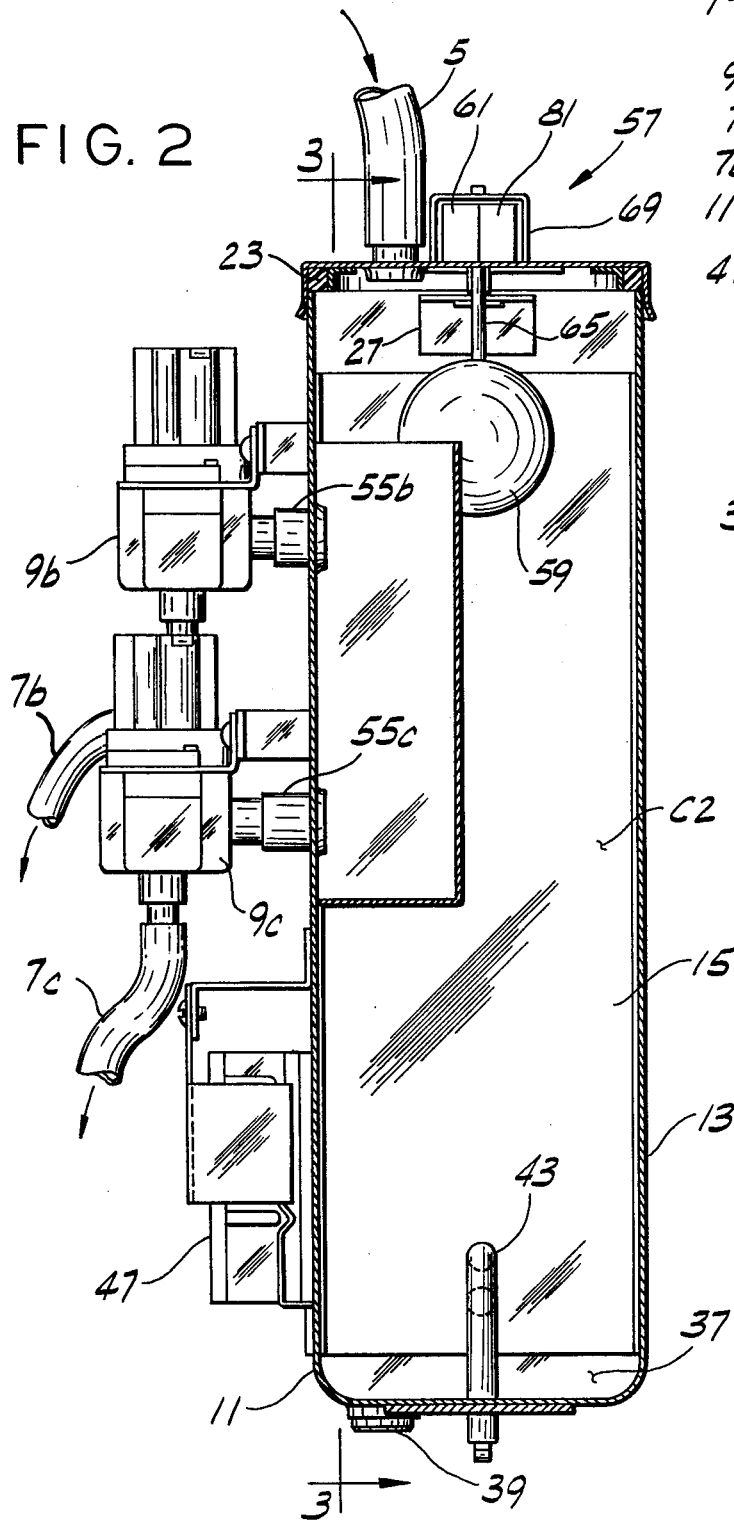
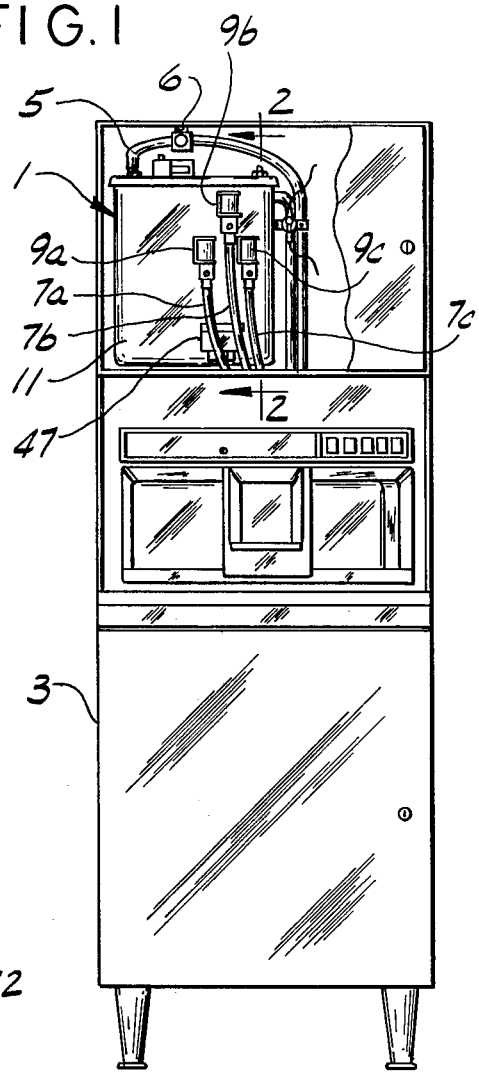

4,252,254

HOT BEVERAGE VENDOR

BACKGROUND OF THE INVENTION

This invention relates to hot water tanks particularly adapted for use in vendors which dispense hot drinks such as coffee, tea, soup and hot chocolate.

It will be understood that in such vendors water is supplied to a hot water tank in the vendor where it is heated for making hot drinks to be vended. Certain problems have arisen in the past in that in "quick-draw" situations, i.e., situations in which numerous hot drink vends are made in rapid succession, the water in the tank has not been heated fast enough to meet the hot water demand. As a result, lukewarm or even cool water has been delivered for making a vend, giving rise to customer complaints.

Moreover, in conventional hot water tanks for hot drink vendors, hot water is often drawn from the tank before the solid particulate matter (e.g., calcium sulfate, calcium carbonate, magnesium carbonate, iron carbonate) in the water has precipitated out of solution with the water. As hot water is drawn from the tank, this solid matter fouls the valving which must be maintenanced periodically at the owner's expense.

Reference may be made to U.S. Pat. Nos. 3,565,045 and 1,047,389 relating to hot water tanks.

SUMMARY OF THE INVENTION

Among the several objects of this invention may be noted the provision of a hot beverage vendor incorporating an improved hot water tank; the provision of such a tank which enables the vendor to make an increased number of hot drink vends in "quick-draw" situations; and the provision of such a tank which allows particulate matter in solution with the water in the tank to settle out of solution prior to exit of the water from the tank.

A hot beverage vendor of the present invention comprises a hot water tank and a water supply system, the latter of which includes a line for supply of water to the tank and a valve in the line. The hot water tank has baffle means extending generally vertically in the tank dividing the tank into first and second vertical chambers, the first chamber being adapted to be supplied with water from the supply line. A flow passage at the bottom of the baffle means provides fluid communication between the two chambers, and heating means in the second of the two chambers adjacent the bottom of the tank heats water flowing into the second chamber from the first chamber, with the water heated by the heating means rising in the second chamber. A hot water collecting tank in the second chamber above the heating means has an open top for flow of heated water from the second chamber into the collecting tank, and an outlet for exit of hot water from the collecting tank. The vendor further comprises means operable on a vend cycle for dispensing hot water from the collecting tank via the aforementioned outlet for the vending of a drink, whereby on a relatively rapid succession of vends, water is relatively rapidly dispensed from the collecting tank, the dispensed water being replaced by heated water flowing into the collecting tank from the second chamber of the hot water tank. Means is also provided responsive to water in the hot water tank dropping to a predetermined level for opening the above-mentioned valve for flow of water into the first chamber of the hot water tank.

Other objects and features will be in part apparent and in part pointed out hereinafter.

BRIEF DESCRIPTION OF THE DRAWINGS

FIG. 1 is a front elevation of a beverage vendor equipped with a hot water tank in accordance with this invention;

FIG. 2 is an enlarged vertical section taken on line 2—2 of FIG. 1;

Corresponding reference characters indicate corresponding parts throughout the several views of the drawings.

DESCRIPTION OF THE PREFERRED EMBODIMENT

Referring first to FIG. 1 of the drawings, a hot water tank of this invention is designated in its entirety at 1 and is shown mounted inside a cabinet of a hot drink vendor 3. The vendor has a water supply system therein, including a line 5 and a solenoid-operated control valve 6 in the line for controlling the supply of water to the system. When this valve 6 is open, water is supplied via line 5 to the hot water tank where the water is heated in a manner to be more fully described hereinafter for delivery through several (e.g., three) lines 7a, 7b and 7c to various stations (brewing and mixing stations, for example) of the vendor where it is mixed with the appropriate ingredients (such as dry instant coffee, soup and chocolate) to constitute the hot beverages to be vended. Three valves 9a, 9b and 9c for lines 7a, 7b and 7c, respectively, are provided for controlling the flow of hot water from the tank to the stations (not shown). In this regard, it will be understood by those skilled in the art that the appropriate valve is operable on a vend to deliver a fixed quantity of hot water from the tank to a respective station in the vendor to make the drink to be vended.

Figure 3:
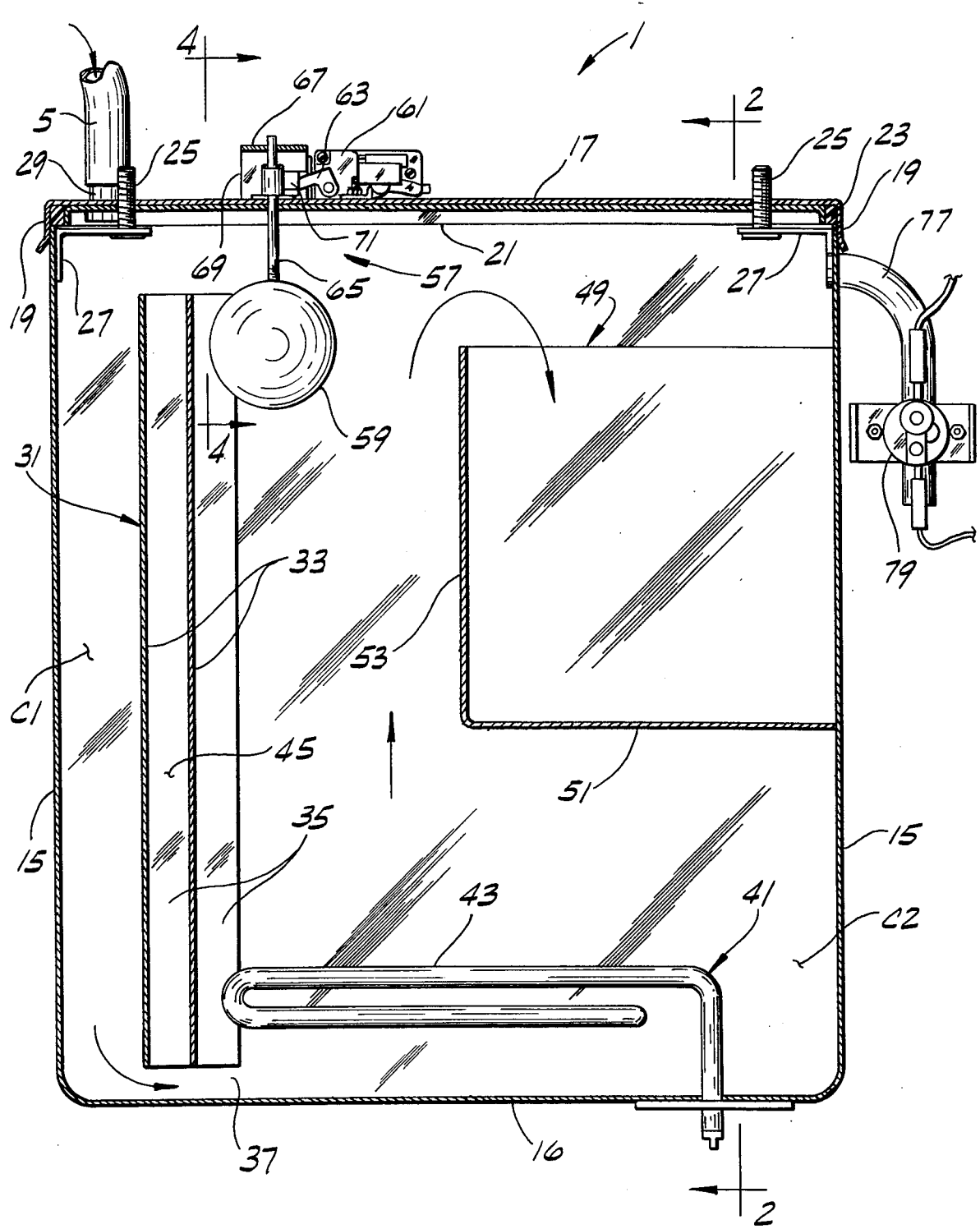
FIG. 3 is a vertical section taken on line 3—3 of FIG. 2.
Figure 4:
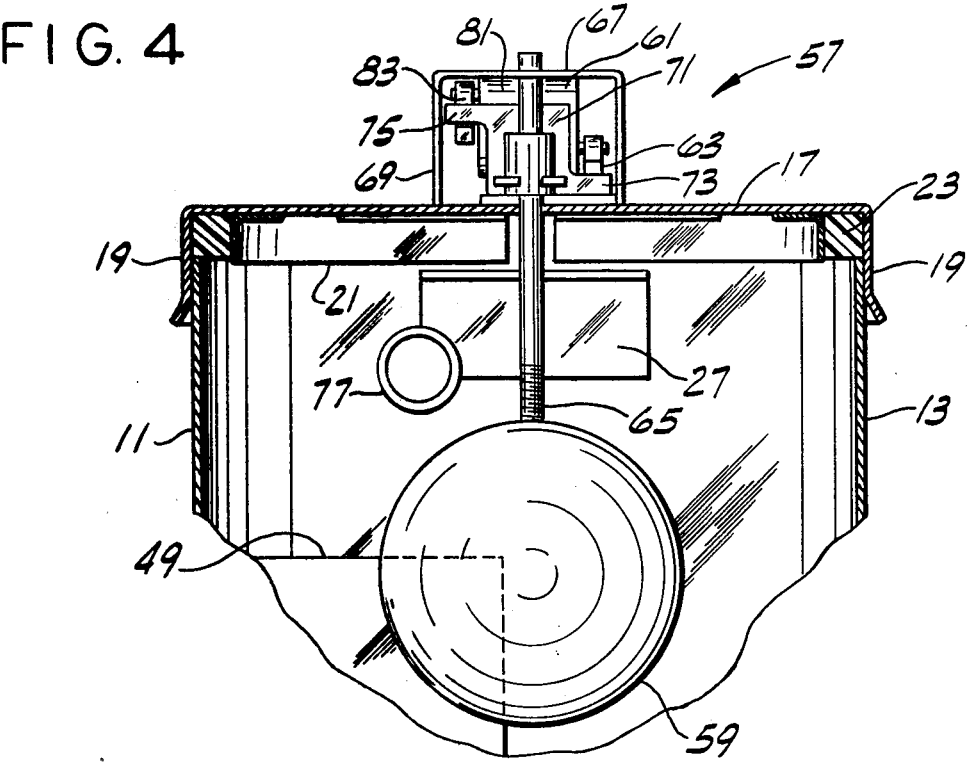
FIG. 4 is an enlarged vertical section taken on line 4—4 of FIG. 3.

As shown in FIGS. 2–4 of the drawings, the hot water tank 1, which preferably is of stainless steel, is generally rectangular in horizontal section, having a front 11 (the side of the tank facing forwardly in the vendor 3), a back 13, sides 15, a bottom 16, and a separate top or cover 17, the latter of which has a downturned flange 19 at its periphery. A reinforcing member 21, generally of the same shape as the cover 17 but smaller in dimension, is mounted as by welding on the underside of the cover for lending added rigidity to the cover. Indicated at 23 is a gasket in the annular space between this reinforcing member and the tank. Fasteners 25 (e.g., nut and bolt assemblies) extending up through angle brackets 27 mounted on opposite sides 15 of the tank inside the tank and thence up through the reinforcing member 21 in cover 17 secure the latter in place on the tank with the top edges of the tank in sealing engagement with the gasket 23 to provide a water-tight seal. Water is introduced, via water line 5, into the tank through an inlet constituted by a short length of vertical pipe 29 through the cover 17 at the left side of the tank (as viewed in FIG. 3), line 5 fitting over the upper end of the pipe 29 as shown.

Means indicated generally at 31 is provided in the tank for directing the relatively cool water supplied to the tank via line 5 downwardly toward the bottom 16 of the tank. This means comprises a pair of parallel closely-spaced baffle plates, each designated 33, extending generally vertically in the tank between the front 11 and back 13 of the tank. These plates, each of which has flanges 35 bent from its vertical edges and affixed (e.g., welded) to the front and back of the tank, divide the tank into two vertical chambers, the first or left-hand chamber as viewed in FIG. 3 being designated C1 and the second or right-hand chamber C2. As shown, the bottom edges of the two baffle plates 33 are spaced above the bottom 16 of the tank, providing a flow passage 37 for flow of relatively cool water from the first chamber C1 into the second chamber C2. A drain 39 is provided in the bottom of the tank in the second chamber C2 (FIG. 2).

Means for heating the relatively cool water as it flows into the right chamber C2 is indicated generally at 41. More specifically, this means 41 comprises an electrical heater constituted by an elongate heating element 43 mounted inside the tank adjacent the bottom of the tank and lying generally in the central vertical plane of the tank. The heating element extends vertically up through the bottom 16 of the tank adjacent the right side 15 (as viewed in FIG. 3) of the tank and thence horizontally generally parallel to the bottom of the tank toward the baffle plates 33. The heating element 43 is doubled or looped over on itself with the outer end portion of the heating element extending below and generally parallel to the horizontal inner portion of the element. The location of the heating element is such that the water flowing from the left chamber C1 through passage 37 into the right chamber C2 is immediately heated. It will be understood that as the temperature of the water gradually increases, it will, by thermal convection, rise up in the right chamber C2. Thus the water having the highest temperatures (e.g., 195° F.) will always be toward the top of chamber C2. This hot water is isolated and insulated from the relatively cool water in the left chamber C1 by the baffle plates 33. The use of two parallel baffle plates rather than a single baffle plate is important in that this arrangement provides a buffer zone 45 of warm (e.g., 130° F.) water between the plates which separates the relatively cool (e.g., 70° F.) water in chamber C1 from the hot water in chamber C2. The temperature of the water in the hot water chamber C2 is controlled by a suitable thermostat 47, which may be wholly conventional, mounted on the front 11 of the hot water tank on the outside of the tank.

Figure 5:
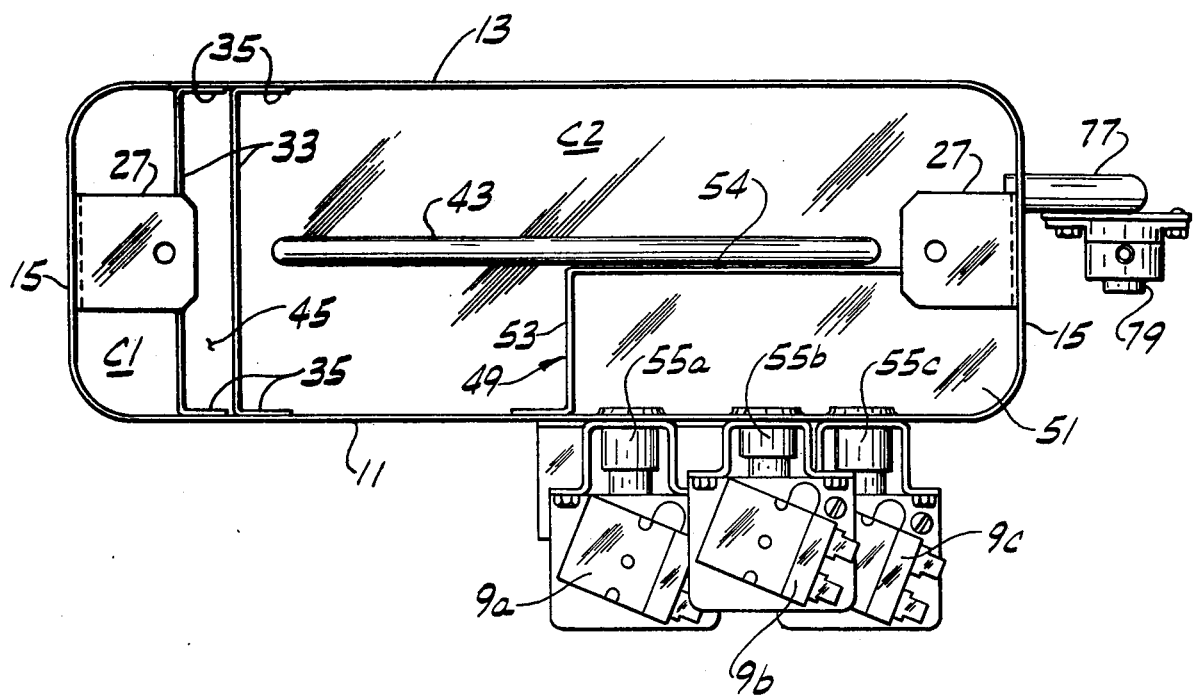
FIG. 5 is an enlarged plan of the hot water tank of this invention with the cover removed to illustrate details.

In accordance with this invention, a hot water reservoir in the form of a second relatively small collecting tank indicated generally at 49 is mounted in the front right-hand corner (see FIG. 5) of the hot water tank 1 in the hot water chamber C2 above the heater 41. This collecting tank, generally rectangular as viewed in plan, has a bottom 51 and sides 53 and 54 opposite the front 11 and right side 15 of the main tank which form two sides of the collecting tank 49. The top of the collecting tank, which is adjacent the top of the hot water chamber C2 but below the upper edges of baffle plates 33, is open for flow of heated water from the hot water chamber C2 into the collecting tank 49. Three outlets 55a, 55b and 55c for lines 7a, 7b and 7c, respectively, are provided in the front 11 of the main tank 1 for exit of hot water from the collecting tank.

Means 57, such as a water level control float 59 and a water level control switch 61, is provided responsive to the water in the second chamber C2 rising to a first predetermined level (a level slightly below that of the upper edges of the baffle plates 33) for actuating the solenoid of control valve 6 thereby to cut off the supply of water to line 5 and hence to the hot water tank 1. As shown best in FIGS. 3 and 4, the water level control switch 61 is mounted on top of the cover 17 of the tank and is adapted to be closed for actuating the solenoid of valve 6 by the upward clockwise movement of pivot arm 63 pinned to the housing of the switch. The water level control float 59 is threaded on the lower end of a rod 65 extending up through the cover 17 and the web 67 of a channel-shaped downwardly opening guide bracket 69. An actuator 71 is mounted on the upper end of the rod between the cover and the web of the guide bracket for movement with the rod and comprises a pair of arms 73, 75, the first of which, arm 73, is engageable with the pivot arm 63 on upward movement of the float 59 and rod 65 for pivoting the arm clockwise (as viewed in FIG. 3) to close the switch 61. The arrangement is such that when the water in the second chamber C2 reaches a level slightly below the upper edges of the baffle plates 33, float 59 rises, pushing the rod 65 and actuator 71 thereon upwardly to pivot arm 63 clockwise. The water level control switch 61 is thereby closed to deenergize the solenoid of the control valve 6 to close the valve and to shut off the flow of water to the system. This prevents the relatively cool water in the first chamber C1 from mixing with the hot water in chamber C2 which would of course reduce the temperature of the water flowing into the collecting tank 49.

In the event means 57 fails to function properly to close the control valve, or the valve for some other reason remains open when it should properly be closed, an overflow pipe 77 adjacent the top of the tank at the right side of the tank is provided. This pipe also vents any steam which may form in the tank. A safety thermostat 79 is clamped onto the overflow pipe and is responsive to the temperature of the vapors passing through the overflow pipe reaching a predetermined level (e.g., 155° F.) for shutting off the current to the electrical heater 41 in the tank.

As hot drink vends are made and hot water is drawn from the collecting tank, the water level in the main tank will drop, causing a concomitant drop in the water level control float 59, rod 65 and actuator 71. This allows the pivot arm 63, which is spring-biased in the counterclockwise direction, to pivot for opening the switch 61 to energize the solenoid of the control valve 6 for flow of fresh water through line 5 into the tank.

Means 57 is also responsive to the water in the second chamber C2 dropping to a second predetermined level below the aforesaid first predetermined level (which was stated to be a level slightly below the upper edges of the baffle plates 33) for shutting off the supply of current to the vend circuit of the vendor. This second predetermined level may be, for example, a level corresponding to or slightly above (⅛ inch, for example) the upper edges of the collecting tank. In this regard, it will be noted that if, for some reason, water is not being supplied via line 5 to the tank 1 as needed to refill it, it is desirable to prevent a vend cycle from being initiated when water is no longer flowing from the second chamber C2 into the collecting tank 49. This prevents a vend cycle from being initiated when the amount of hot water in the collecting tank may be insufficient for a full vend.

Thus, means 45 further comprises a second switch 81 mounted directly alongside switch 61 on top of the cover 17 of the hot water tank 1. This switch is adapted to be actuated for shutting off the supply of current to the vend circuit of the vendor by the pivotal movement of a pivot arm 83 (identical to pivot arm 63) pinned to the housing of the switch. The arm 75 of the actuator 71 is engageable with this pivot arm 83 on downward movement of the float 59 in the second chamber C2 for pivoting the outer end of arm 83 downwardly (see FIG. 4) to close the switch 81. The arrangement is such that when the water in the second chamber drops to a level corresponding to the upper edges of the hot water collecting tank 49, the float 59 drops a distance sufficient to cause arm 75 of the actuator 71 to engage the outer end of pivot arm 83 and to pivot it downwardly to actuate switch 81 to shut off the supply of current to the vend circuit. This prevents further vends from being made until the water level in the second chamber C2 rises to a level somewhat above the upper edges of the collecting tank, whereupon the float rises a distance sufficient to permit the pivot arm 83, which is springbiased in the counterclockwise direction as viewed from the back of the hot water tank, to pivot for opening switch 81.

It will be noted that the flow of water through the hot water tank 1 is a relatively orderly flow, with water entering the upper end of the first chamber C1 flowing down toward the bottom 16 of the tank, through flow passage 37 into the lower part of the second chamber C2 where it is initially heated, and thence, as its temperature increases, gradually upwardly in the hot water chamber C2 until it finally enters the collecting tank 49 for delivery on demand to make the hot drink to be vended This orderly unagitated flow pattern promotes the precipitation or settling out of any solid particulate matter (e.g., calcium sulfate, calcium carbonate, magnesium carbonate, iron carbonate) that may be in solution with the water prior to the entry of that water into the collecting tank 49. This is advantageous in that such matter, if not removed from solution, tends to foul the valves 9 which must then be cleaned, resulting in downtime of the vendor and economic loss to the operator.

As previously mentioned, the temperature of the water in the second chamber C2 of the tank 1 increases toward the top of that chamber. For example, the temperature of the water immediately above the heating element 43 may be 165° F., while the temperature of the water adjacent the top of the collecting tank may be 195° F. or more. Thus, the water flowing into the collecting tank 49 is always the hottest water in the hot water tank. This arrangement is highly desirable, especially in "quick-draw" situations (where a relatively large number of hot-drink vends are made in rapid succession) in that it increases the number of hot beverage vends which can be made before the temperature of the water delivered for making a vend becomes unacceptably low.

In view of the above, it will be seen that the several objects of the invention are achieved and other advantageous results attained.

As various changes could be made in the above constructions without departing from the scope of the invention, it is intended that all matter contained in the above description of shown in the accompanying drawings shall be interpreted as illustrative and not in a limiting sense.

What is claimed is:

1. A hot beverage vendor comprising a hot water tank, a water supply system including a line for supply of water to the tank and a valve in the line, said tank having baffle means extending generally vertically in the tank dividing the tank into first and second vertical chambers, the first chamber being adapted to be supplied with water from the supply line, a flow passage at the bottom of the baffle means providing fluid communication between the two chambers, heating means in the second of the two chambers adjacent the bottom of the tank for heating water flowing into the second chamber from the first chamber, with water heated by the heating means rising in the second chamber, a hot water collecting tank mounted in the second chamber of said hot water tank above the heating means and having an open top for flow of heated water from the second chamber into the collecting tank and an outlet for exit of hot water from the collecting tank, means operable on a vend cycle for dispensing hot water from the collecting tank via said outlet for the vending of a drink, whereby on a relatively rapid succession of vends water is relatively rapidly dispensed from the collecting tank, the dispensed water being replaced by heated water flowing into the collecting tank from the second chamber of the hot water tank, and means responsive to water in the hot water tank dropping to a predetermined level for opening said valve for flow of water into the first chamber of the hot water tank.

2. A vendor as set forth in claim 1 wherein said baffle means comprises a pair of generally parallel closely spaced baffle plates.

3. A vendor as set forth in claim 1 wherein the bottom of said baffle means is spaced above the bottom of said hot water tank providing said flow passage for flow of water at the bottom of said first chamber of the hot water tank into said second chamber of the hot water tank for being heated by said heating means.

4. A vendor as set forth in claim 1 wherein said heating means comprises an elongate heating element extending generally horizontally adjacent the bottom of said hot water tank.

5. A vendor as set forth in claim 4 wherein said heating element is doubled over on itself with the outer end portion of the heating element extending generally parallel to the horizontal inner portion of the element.

6. A vendor as set forth in claim 1 wherein said hot water tank has an inlet at the top of the tank for entry of water into said first chamber.

7. A vendor as set forth in claim 1 wherein the top of said collecting tank is adjacent the top of said second chamber.

8. A hot beverage vendor comprising a hot water tank, a water supply system including a line for supply of water to the tank and a valve in the line, said tank having baffle means extending generally vertically in the tank dividing the tank into first and second vertical chambers, the first chamber being adapted to be supplied with water from the supply line, a flow passage at the bottom of the baffle means providing fluid communication between the two chambers, heating means in the second of the two chambers adjacent the bottom of the tank for heating water flowing into the second chamber from the first chamber, with water heated by the heating means rising in the second chamber, a hot water collecting tank in the second chamber above the heating means having an open top for flow of heated water from the second chamber into the collecting tank and an outlet for exit of hot water from the collecting tank, means operable on a vend cycle for dispensing hot water from the collecting tank via said outlet for the vending of a drink, whereby on a relatively rapid succession of vends water is relatively rapidly dispensed from the collecting tank, the dispensed water being replaced by heated water flowing into the collecting tank from the second chamber of the hot water tank, and float means responsive to water in the hot water tank dropping to a predetermined level for opening said valve for flow of water into the first chamber of the hot water tank, said float means comprising a float adapted to float in the water in said second chamber of the hot water tank and a switch operable by the float, the float dropping to actuate the switch to open the valve for flow of water into the first chamber of the hot water tank on the water in the second chamber dropping to said predetermined level.

9. A vendor as set forth in claim 8 further comprising a second switch operable by the float, the float dropping to actuate the switch to cut off current to the vend circuit of the vendor to prevent further vends from the vendor on the water in the second chamber dropping to a second predetermined level below said first predetermined level.

10. A hot water tank particularly adapted for use in a hot beverage vendor of the type comprising a water supply system including a line for supply of water to the tank and a valve in the line, and means operable on a vend cycle for dispensing hot water from the tank for the vending of a drink, said tank having an inlet for entry of water into the tank, heating means in the tank adjacent the bottom of the tank, means for directing water entering the main tank at said heating means for being heated thereby, with water heated by the heating means rising in the tank, a hot water reservoir in the form of a collecting tank mounted in the hot water tank above the heating means and having an open top for flow of heated water into the collecting tank, hot water in the collecting tank being adapted to be dispensed via said dispensing means, and means responsive to water in the hot water tank dropping to a predetermined level for opening said valve for flow of water into the hot water tank.

11. A hot water tank as set forth in claim 10 wherein the means for directing water flowing into the tank at the heating means comprises baffle means extending generally vertically in the tank thereby dividing the tank into a first vertical chamber for receiving water entering the tank through said inlet and a second vertical chamber for holding water heated by said heating means, and a flow passage at the bottom of the baffle means providing fluid communication between the two chambers.

12. A hot water tank particularly adapted for use in a hot beverage vendor of the type comprising a water supply system including a line for supply of water to the tank and a valve in the line, and means operable on a vend cycle for dispensing hot water from the tank for the vending of a drink, said tank having an inlet for entry of water into the tank, heating means in the tank adjacent the bottom of the tank, means for directing water entering the tank at said heating means for being heated thereby, with water heated by the heating means rising in the tank, a hot water collecting tank above the heating means having an open top for flow of heated water into the collecting tank, hot water in the collecting tank being adapted to be dispensed via said dispensing means, and float means responsive to water in the hot water tank dropping to a predetermined level for opening said valve for flow of water into the hot water tank, said float means comprising a float adapted to float in the water in said second chamber of the hot water tank and a switch operable by the float, the float dropping to actuate the switch to open the valve for flow of water into the first chamber of the hot water tank on the water in the second chamber dropping to said predetermined level.

13. A hot water tank as set forth in claim 12 further comprising a second switch operable by the float, the float dropping to actuate the switch to cut off current to the vend circuit of the vendor to prevent further vends from the vendor on the water in the second chamber dropping to a second predetermined level below said first predetermined level.

14. A hot water tank as set forth in claim 11 wherein said baffle means comprises a pair of parallel closely spaced baffle plates.

15. A hot water tank as set forth in claim 11 wherein the bottom of said baffle means is spaced above the bottom of the tank providing said flow passage for flow of water at the bottom of said first chamber of the hot water tank into said second chamber of the hot water tank for being heated by said heating means.

16. A hot water tank as set forth in claim 10 wherein said heating means comprises an elongate heating element extending generally horizontally adjacent the bottom of said hot water tank.

17. A hot water tank as set forth in claim 16 wherein said heating element is doubled over on itself with the outer end portion of the heating element extending generally parallel to the inner portion of the element.

* * * * *